United States Patent [19]

Spears, Jr.

[11] 4,110,172
[45] Aug. 29, 1978

[54] SOLAR ENERGY COLLECTING POND

[75] Inventor: John F. Spears, Jr., Mt. Prospect, Ill.

[73] Assignee: UOP Inc., Des Plaines, Ill.

[21] Appl. No.: 782,147

[22] Filed: Mar. 28, 1977

Related U.S. Application Data

[63] Continuation-in-part of Ser. No. 764,255, Jan. 31, 1977, and Ser. No. 764,256, Jan. 31, 1977.

[51] Int. Cl.$^2$ ............................................. B01D 1/14
[52] U.S. Cl. ................................. 202/234; 126/271; 159/1 S; 203/DIG. 1; 203/10; 203/49; 203/DIG. 17; 203/DIG. 20; 261/119 R; 261/125; 261/153
[58] Field of Search ................. 261/153, 119 R, 125; 202/234, 175; 203/DIG. 1, 10, 11, 100, 49, DIG. 20, DIG. 17; 159/1 S, 1 SF; 126/271, 270, 271.1; 165/45

[56] References Cited

U.S. PATENT DOCUMENTS

| | | | |
|---|---|---|---|
| 983,424 | 2/1911 | Brosius | 203/49 |
| 2,710,178 | 6/1955 | Froelich | 261/119 R |
| 2,804,379 | 8/1957 | Wistrich et al. | 261/153 |
| 3,257,291 | 6/1966 | Gerber | 203/49 |
| 3,284,318 | 11/1966 | Coanda et al. | 203/49 |
| 3,514,942 | 6/1970 | Kyryluk | 202/234 |
| 3,894,528 | 7/1975 | Stubblefield | 261/119 R |
| 4,010,080 | 3/1977 | Tsay et al. | 203/DIG. 1 |
| 4,056,090 | 11/1977 | Henriques et al. | 126/271 |

*Primary Examiner*—Wilbur L. Bascomb, Jr.
*Attorney, Agent, or Firm*—James R. Hoatson, Jr.; Robert W. Erickson; William H. Page, II

[57] ABSTRACT

A water-containing pond for collecting solar energy for utilization in a process for recovering potable water from non-potable water and/or for the generation of power. The solar pond is designed to increase the quantity and efficiency of water evaporation, from heated pond water, into a heated flowing air stream. Construction in such that there is afforded an increase in the absorptivity/emissivity (a/e) ratio with respect to the incidence of solar radiation.

10 Claims, 5 Drawing Figures

SOLAR ENERGY COLLECTING POND

RELATED APPLICATIONS

The present application is a continuation-in-part of my two copending applications, Ser. Nos. 764,255 and 764,256, both of which were filed on Jan. 31, 1977. All the teachings of these two copending applications are incorporated herein by way of specific reference thereto.

APPLICABILITY OF INVENTION

Broadly considered, the solar energy collecting pond herein described is intended for use in the potable water recovery and/or power generation processes disclosed in the above-identified copending applications. Briefly, these processes primarily involve the recovery of potable water from a source of salinous water — eg. sea and/or ocean water. Also described are certain modifications which afford the simultaneous generation of power. A portion of salinous water and an air stream are introduced into a solar radiation heat sink, with the air stream flowing over the salinous water in direct contact therewith. Heated, water-containing air is withdrawn from the heat sink and reduced in temperature to recover potable water. The heated salinous water, from the heat sink, may be partially recycled thereto, or totally introduced into a flash separation zone, maintained at a subatmospheric pressure to provide a non-salinous vaporous phase which is passed through a turbine, from the resulting motion of which power is generated. The exiting turbine vapors are cooled and condensed via indirect contact with a second, colder portion of salinous water to recover additional potable water. Alternatively, the heated, water-containing air stream may be cooled by vaporizing a hydrocarbon which then passes through a turbine for the purpose of producing energy.

According to many knowledgeable scientific experts, the world is currently entering into a period of time which future historians may well refer to as the "energy shortage" age. Whether considering (1) the availability of natural gas, (2) the sufficiency of oil reserves, or (3) untapped sources of coal, the consensus appears to indicate that a severe energy crisis is, or will soon become an established fact. One consequence, of course, is that a corresponding shortage of electrical power can be foreseen; that is, it will no longer be practical to convert one or more of these energy sources into electrical power. In a similar vein, many areas of the world, especially those which are arid, face a critical shortage of potable water, both for human consumption and irrigation. Although located throughout the world, such areas abound particularly in the American Southwest, the Middle Eastern countries and in the Northern desert regions of Africa. Coincidentally, many of these countries, or localized areas thereof, either border upon, or are readily accessible to sea and/or ocean waters. Also coincidental is the fact that these areas have moderate to hot climates with high average air temperatures and receive a relatively high amount of solar radiation. Exemplary of these are Kuwait and Saudi Arabia, the Western coast of the latter bordering upon the Red Sea.

The solar pond herein described is principally intended for integration with a technique for recovering potable water from otherwise impotable water. While applicable to the processing of many types of brackish water and/or water having a high degree of salinity, the solar pond is primarily intended to be utilized in recovering potable water from river, sea and/or ocean water, and makes use of the natural, virtually limitless supply or radiant solar energy.

Initially, a portion of salinous water is introduced into a solar radiation heat sink — e.g. a covered solar pond. An air stream is also introduced into the heat sink in such a manner as to flow over the salinous water. These flowing streams are maintained within the heat sink, being exposed to absorbed radiant solar energy therein, for a time sufficient to increase their temperatures, as well as the water content of the air stream. The heated, evaporated water-containing air stream is withdrawn from the heat sink, cooled and passed into suitable separation means from which potable watere is recovered. At least a portion, but preferably all of the air stream is then recycled to the solar radiation heat sink.

Where energy production is a major consideration, it is recovered by employing the heated, water-containing water stream as the heat-exchange medium used to vaporize a light hydrocarbon stream. Vaporized hydrocarbons pass into and through a turbine, from the resulting motion of which energy is recovered. Exiting hydrocarbon vapors are cooled and condensed, via indirect contact with air or a second salinous water portion, and re-introduced into the vaporizer. The energy recovered from the resulting motion of the turbine may be employed to generate power; however, it is more advantageous and beneficial to the process when used to drive compressors, pumps, etc.

Where power generation is desired, a portion of the heated salinous water from the solar radiation heat sink may be introduced into a flash separation zone, to provide a non-salinous vaporous phase and a salinous liquid phase. The former passes through a turbine, and additional power is generated from the resulting motion thereof. Exiting turbine vapors are cooled and condensed to recover additional potable water. The final salinous liquid phase, from the flash separation zone may be returned to the source, or recycled in part to the solar radiation heat sink, preferably the former.

The foregoing delineates the area in which the solar energy collecting pond encompassed by the present inventive concept is intended to be used. To reiterate, however, the solar pond is applicable where heated water evaporates into a flowing air stream, the temperature of which is also increasing, and which also contacts the heated pond water directly.

OBJECTS AND EMBODIMENTS

A principal object of the present invention is to provide a solar energy collecting pond. A corollary objective directs itself to a solar pond which affords an increased absorptivity/emissivity ratio.

A specific object of my invention involves a solar pond which enhances the recovery of potable water from salinous and/or otherwise impotable water.

These, as well as other objects, are achieved through the use of a solar energy collecting pond which comprises, in cooperative combination: (a) a water-containing reservoir having (i) at least one water inlet conduit communicating with water supply means, (ii) at least one water outlet conduit, (iii) at least one air inlet conduit communicating with air supply means and, (iv) at least one air outlet conduit, said air conduits disposed above said water conduits; (b) a layer of insulating material contacting the interior surface of the bottom and vertical walls of said reservoir; (c) a horizontal plate disposed above said air and water conduits, and having (i) substantially the same area as said reservoir and, (ii) a coating of spectrally-selective material contiguous with the upper surface thereof; (d) a plurality of spaced-apart vertical support standards attached to said horizontal plate and in contact with the bottom of said reservoir; and, (e) a transparent cover attached to the upper peripheral edges of said reservoir, and forming a dead air space above said horizontal plate.

In another embodiment, the vertical support standards extend upwardly through the horizontal plate into the dead air space. A more specific embodiment is directed toward a plurality of separated, horizontal baffles having alternating downwardly-angled and upwardly-angled edges, which is disposed intermediate the air inlet conduit and the surface of the water contained in the solar pond.

These, as well as other objects and embodiments, will become evident to those possessing the requisite skill in the appropriate art from the following detailed description of the present invention. First, however, a discussion of known applicable prior art is believed to be warranted.

PRIOR ART

It would appear that the greater proportion of available prior art consists of articles published in various trade and scientific journals. With respect to issued patents, these appear to be principally directed toward various devices capable of utilizing radiant solar energy for (1) heating homes and other types of structures, and, (2) the desalination of non-potable water. For example, respecting the latter, U.S. Pat. Nos. 2,803,592 (Cl. 202-234), issued Aug. 20, 1957, 2,813,063 (Cl. 202-234), issued Nov. 12, 1957 and 2,848,389 (Cl. 202-234) are directed toward a device, in the form of a solar still, for the purification of non-drinkable water. The first of these, U.S. Pat. No. 2,803,591, involves a technique where impure water is introduced, via spraying, into a closed and well-insulated chamber containing hot, dry air which becomes enriched with water vapor. The saturated hot air is withdrawn and cooled, yielding a condensate which is recovered as potable water. The device utilizes a complicated series of mirrors to concentrate the rays of the sun for the purpose of heating the air which is introduced into the spray chamber.

In U.S. Pat. No. 2,813,063, there is described a solar still having a wick which becomes saturated with salt water. Solar radiation heats the wick and causes the evaporation of water. The still is constructed from a semi-rigid, flexible material such as polyethylene, and is transparent with respect to solar radiation. A similar solar still, absent the wick, is illustrated in U.S. Pat. No. 2,848,389.

Of further interest is an article entitled "Desalination of Sea Water Using Solar Radiation Under Retarded Evaporation Conditions", *Industrial Engineering Chemistry, Process Design Development,* Volume 14, No. 4, 1975, pp. 351-358. Described is desalination process which uses the temperature difference between the surface sea water and the deep sea water. A shallow pond, swamp area, or a large heating flat is proposed for use as the radiant solar energy sink. Water, from the surface, is pumped into the pond where it is heated by solar radiation. An insoluble monolayer, or a thin, transparent plastic sheet on the water surface is suggested for suppressing the evaporative heat loss from the water layer. The heated water is fed into a heat exchanger which is also a vacuum chamber. The warm sea water partly flash evaporates while it runs down a packed section. The vapor condenses in an adjoining section over cooling coils being supplied with cold, deep sea water, which cooling water is returned to the sea.

Briefly referring to the accompanying drawing which is illustrative of several embodiments of the present invention, it becomes clear that there is no recognition in the foregoing prior art, either singularly, or collectively of the solar energy collecting pond which is encompassed by my invention. There is no provision of a device which simultaneously increases the temperature of salinous water and a constantly flowing air stream. Solar energy is employed only to raise the temperature of dry air and not to effect evaporation of heated water into heated air. Furthermore, the construction and design of the present solar pond particularly encourages the evaporation from the surface of the water into the flowing air stream. In comparison, the prior art preoccupies itself with every attempt to limit evaporation from the salinous water since this effects a cooling of the water utilized to recover the collected solar energy.

SUMMARY OF INVENTION

The precise design of any given potable water recovery and power generation system is most certainly governed by existing economic considerations in the locale where the process is installed; fundamental are the comparative values placed upon potable water and energy. Other factors must obviously be considered; principal among these is the solar radiation heat sink which singularly has the greatest impact both on the necessary capital expenditure and the economically successful operation of the unit.

Whether designed solely for the production of potable water, or for the simultaneous generation of power, two of the most important process-related variables constitute the temperatures to which the flowing air stream and the salinous water are increased within the solar radiation heat sink. It follows that these variables are primarily dependent upon several principal factors: (1) the dimensions and efficiency of the solar radiation heat sink; (2) the available insolation, which may be conveniently expressed as the quantity of B.T.U.'s, from the sun, falling upon a square foot of heat sink surface per day, or the incidence of solar energy; (3) the temperature at which the air stream is introduced, or recycled to the solar radiation heat sink; and, (4) the effective residence time of the salinous water within the heat sink.

Although the solar radiation heat sink may take a wide variety of forms and/or designs, the present invention directs itself to a covered solar pond in combination with a flat plate collector. In the interests of low initial capital investment, a covered solar pond constitutes an economical device for absorbing a significant portion of the insolation falling upon it from the sun during the period of daylight hours. Salinous water is pumped into the solar pond to a depth which varies seasonally, much the same as the insolation from the sun varies seasonally. Depending upon the season, as well as the desired temperature of the heated water and the air saturation level, a pond depth in the range of about one to about ten inches is acceptable, although a solar pond depth from two to about eight inches appears to be the most practical. The length and width of the solar pond (or diameter if circular) are generally determined by the terrain and climate which are peculiar to the locale of the unit. The temperature to which the water in the solar pond will be heated, and that of the air stream flowing therethrough, depends upon the relative quantities of potable water and generated power which are withdrawn from the selected installation. For example, a solar pond receiving insolation in the amount of 3,000 BTU/sq.ft./day, and functioning at an efficiency of about 60.0%, would heat a three-inch level of water from about 85° F. up to about 200° F. during a period of approximately 10 daylight hours. Solar pond efficiency is determined by comparing its absorptivity with the total insolation available. In accordance with the present invention, the solar pond is designed and constructed to maximize the efficiency with respect to the available insolation and also to increase the $a/e$ (absorptivity/emissivity) ratio.

In order to increase the efficiency of the solar pond, evaporative heat loss therefrom is inhibited through the use of a covering. Suitable coverings are those which are transparent to solar radiation, while simultaneously being opaque to long wave radiation. Obviously, since the technique employed herein requires a flowing air stream, a covering is necessary to provide an enclosed system. Additionally, a suitable covering will provide an insulating effect between the air stream and water being heated, and the atmosphere, such that conductive and convective heat loss is minimized. A relatively thin (four to about six mils) sheet of polyvinyl chloride can be suitably employed, as can two such sheets which are uniformly tacked to provide a multitude of dead air bubbles having a minimum air gap of about one inch. The plastic sheet can be used in combination with an underlayer of acrylic, fiberglass, polyvinyl carbonate, or other plastic which is opaque to long wave radiation, and which is formed into a modified sine wave having angles of about 45° to about 75°. Other suitable coverings include glass wool which is reinforced with plastic, opaque to long wave radiation, in combination with a tacked polyvinyl chloride sheet; a mat of fused polyvinyl chloride bubbles, about one to two inches; and, a combination of polyvinyl chloride-coated fiberglass to which the polyvinyl sheet is uniformly tacked.

Also of importance, with respect to the efficiency of the solar pond, is the insulation of the sides and bottom thereof. Several techniques to accomplish this will become evident to those possessing the requisite skill in the appropriate art. A variety of commercially-available insulating material can be used, including fiberglass, styrofoam, vermiculite, matted or fused alimina fibers, etc. This is placed as a layer along the bottom surface and vertical sides of the pond which is generally formed as a depression in the soil or sand. The insulating layer is lined (preferably on both sides) with a water-impermeable substance such as a thin, black sheet of polymeric material including polyethylene, polyvinyl chloride, polyvinyl carbonate, etc. Insulating material can be formed on and thus become integral with the water-impermeable polymeric sheet.

The covered and well-insulated solar pond fosters the evaporation of water vapor from the salinous water at the bottom of the pond, and saturation therewith of the heated air stream flowing over the salinous water. As used herein, and in my copending applications, the term "saturation" is not necessarily intended to connote 100% saturated air. Rather, it refers to a more practically obtained level of about 95%, or more, of the possible water content of the air at its existing temperature. As a practical matter, the higher the temperature attained by both streams, the greater will be the quantity of potable water produced per pound of circulate air. Likewise, the quantity of generated power, where produced, increases, as does the effective degree to which insolation and the absorbed radiant solar energy are utilized. To enhance this further, the transparent covering preferably takes on a domed-shape and an imperforate horizontal plate is disposed therebelow to form a dead air space.

The horizontal plate is coated along its entire upper surface with a spectrally-selective material which fosters the absorption of sunlight while reducing the emission of infra-red radiation; this results in the attainment of a higher equilibrium temperature. One method of producing the solar selective coating has been to coat the surface with black copper oxide through the oxidation of a copper surface, or via thermal decomposition of copper nitrate. Another spectrally selective coating is black nickel formed by electro-deposition, or black chrome which has been electroplated thereon.

One particularly suitable solar pond is illustrated (in elevation) in the accompanying drawing; as shown, the flowing air stream is introduced into an area above that into which the salinous water is charged. As shown, the horizontal plate is intermediate the transparent dome and the air inlet and outlet conduits. The horizontal plate is supported by a plurality of vertical standards having a plurality of horizontal fins. The area below the horizontal plate is divided by means of a series of separated baffles having alternating downwardly-angled and upwardly-angled edges. These baffles provide a serpentine-like path for the heated air stream.

In additionally describing my invention, reference will be made to the accompanying drawing which illustrates the several embodiments. It is understood that the drawing is not to scale, and is presented only for clarification; there is no intent to impose an undue limitation upon the scope and spirit of the invention as defined in the appended claims by presentation of the drawing.

DETAILED DESCRIPTION OF DRAWING

Figure 1:
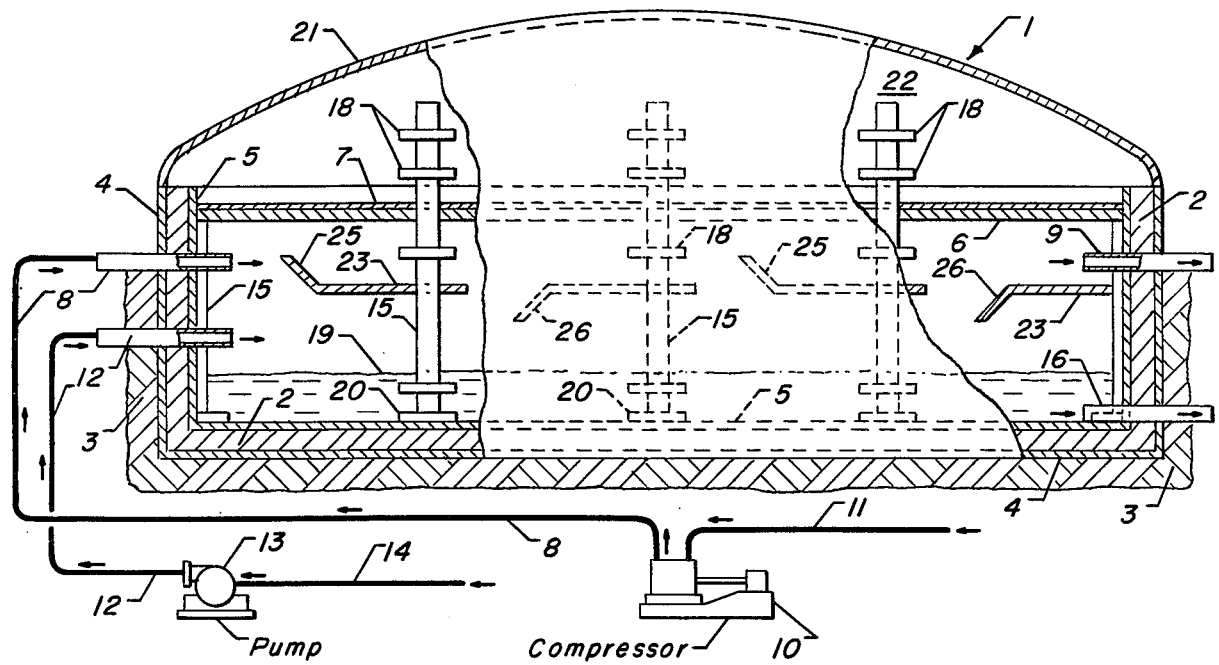
FIG. 1 is a partially-sectioned elevation of a solar energy collecting pond generally indicated as 1. As shown, the pond is partially below the grade level of soil or sand 3.

With specific reference now to the drawing, the solar pond 1 is shown in a partially-sectioned elevation view in FIG. 1. The pond is formed in a depression in soil 3 by insulation layer 2 which is lined on both outer and inner surfaces f4 and 5 with a water-impermeable substance. A horizontal plate 6, having its upper surface coated with a spectrally selective black-bodied material 7, is disposed proximate to the upper peripheral edges of insulation layer 2 and forms a dead air space 22 below transparent dome 21.

The solar pond 1 is adapted with an air inlet conduit 8 and an air outlet conduit 9 disposed below horizontal plate 6 and above the level of pond water 19. Conduit 8 discharges air from compressive means 10 which receives ambient or recycled air through suction line 11. A salinous water inlet conduit 12 communicates with the interior of solar pond 1 and water-supplying means 13 which is connected to the water source by way of suction line 14. Water is removed from the pond through outlet conduit 16. Although the air and water conduits are shown singularly, the size of the solar pond dictates a plurality of each.

Horizontal plate 6 is supported by a plurality of vertical standards 14 which terminate in a flanged portion 20 which rests on the bottom surface of the solar pond. In a preferred configuration, standards 15 extend upwardly through horizontal plate 6 into dead air space 22. Internal vertical standards are adapted with a plurality of fins 18; these may be horizontal as shown in FIG. 1, or vertical as hereinafter described. At least one such fin 18 is along that portion of vertical support standard 15 which extends into dead air space 22; likewise, at least one fin is below the surface of pond water 19 and one within the area through which the air stream is flowing.

Also supported by vertical standards 15 is a plurality of separated horizontal baffles 23 having alternating upwardly-angled edges 25 and downwardly-angled edges 26. These provide a serpentine-like air flow over the pond water 19 and enhance the pick-up of evaporated water.

Figure 2:
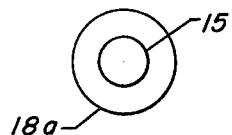
FIGS. 2 and 3 are plan views of vertical support standards 15, being presented to show alternative configurations of the horizontal fins adapted thereto.
Figure 3:

Variations of fins 18 are illustrated in the plan views of FIGS. 2 and 3, being substantially circular (18a) and as a pair of 180°-opposite "I'bars" (18b), respectively.

Figure 4:
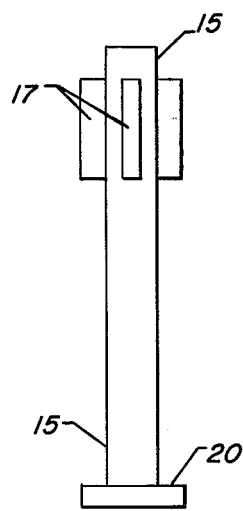
FIG. 4 illustrates, in elevation, a vertical support standard having a plurality of vertical fins 17.
Figure 5:
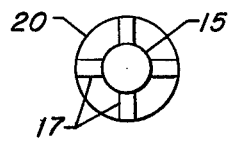
FIG. 5 constitutes the plan view thereof.

FIG. 4 in elevation, and FIG. 5, in plan view, illustrate still another fin variation in the form of four vertical flared portions 17.

The foregoing specification, when viewed in conjunction with the accompanying drawing, is believed to present a clear understanding and a concise description of the solar energy collecting pond encompassed by the present invention.

I claim as my invention:

1. A solar energy collecing pond which comprises, in cooperative combination:
    (a) a water-containing reservoir having bottom and vertical walls with an interior surface and said reservoir further having (i) at least one water inlet conduit communicating with water supply means, (ii) at least one water outlet conduit, (iii) at least one air inlet conduit communicating with air supply means and, (iv) at least one air outlet conduit, said air conduits being disposed above said water conduits;
    (b) a layer of insulating material contacting the interior surface of the bottom and vertical walls of said reservoir;
    (c) a horizontal plate disposed above said air and water conduits, and having (i) substantially the same area as said reservoir and, (ii) a coating of spectrally-selective material contiguous with the upper surface thereof;
    (d) a plurality of spaced-apart vertical support standards attached to said horizontal plate and in contact with the bottom of said reservoir; and,
    (e) a transparent cover attached to the upper peripheral edges of said reservoir, and forming a dead air space above said horizontal plate.

2. The solar pond of claim 1 further characterized in that said horizontal plate is imperforate.

3. The solar pond of claim 1 further characterized in that said layer of insulating material is linked on one surface thereof with a water-impermeable substance.

4. The solar pond of claim 1 further characterized in that both inner and outer surfaces of said insulating material are lined with a water-impermeable substance.

5. The solar pond of claim 1 further characterized in that said support standards extend upwardly through said horizontal plate into said dead air space.

6. The solar pond of claim 1 further characterized in that said vertical support standards contain at least one fin.

7. The solar pond of claim 6 further characterized in that said vertical support standards contain at least one horizontal fin.

8. The solar pond of claim 6 further characterized in that said support standards contain a plurality of fins.

9. The solar pond of claim 8 further characterized in that (i) at least one of said fins is disposed within said dead air space, (ii) at least one is disposed below said horizontal plate and, (iii) at least one is disposed below the surface of water contained in said pond.

10. The solar pond of claim 1 further characterized in that a plurality of separated horizontal baffles having alternating downwardly-angled and upwardly-angled edges is disposed intermediate said air inlet conduit and the surface of the water contained in said pond.

* * * * *